Patented Apr. 21, 1942

2,280,340

UNITED STATES PATENT OFFICE 2,280,340

VERMICIDAL COMPOSITION

Luther H. Miller, San Antonio, and Thomas O. Booth, Fort Worth, Tex.

No Drawing. Application August 8, 1938, Serial No. 223,764

4 Claims. (Cl. 167—53)

This invention is directed to a composition and method of using the same to serve as a vermicidal agency in the treatment of internal parasites in the stomachs of cattle, sheep and goats.

It is well known that in ordinary pasturing the animals in grazing take in with the natural food thus obtained the parasitic larvae which, under proper atmospheric conditions, develop from eggs dropped to the ground and following their development climb onto the leaves of the grass and other vegetation and are taken into the stomach of the animal in grazing. These parasites, after reaching the stomach, attach themselves to the walls of the stomach and proceed to suck the blood therefrom, burying their heads directly into the mucous membranes, with the result of weakening the animal and causing it to lose flesh and in cases of unusually severe infestation may injure the lining of the stomach and finally cause the death of the animal.

It is further known that the eggs of the parasites hatch out under certain atmospheric conditions and that the eggs may lay on the ground for a period of a year before conditions are right for their hatching. The life of the larvae developed is approximately one year and proper treatment is, therefore, necessary to kill the worms in the stomach as well as killing those being taken into the stomach and to maintain this control as long as there is range infestation.

In providing the improved vermicide, the formula of the composition is made up and advantage taken of certain natural conditions to render the composition effective for the purpose designed without detrimental effect on the animal.

The composition is in the following proportions:

| | | |
|---|---|---|
| Copper sulphate | grams | 128 |
| Sodium arsenite | do | 32 |
| Sodium chloride | pounds | 70 |
| Limestone flour (ground oyster shell) | do | 10 |
| Spent bone black (or bone meal) | do | 20 |

These proportions, while ordinarily maintained, may be materially varied according to the purposes, uses and conditions obtaining at the particular time the same is indicated to be used. For instance, the proportion of vermicidal agencies may be reduced after the mixture has been used for a sufficient length of time to reduce pasture infestation.

No vermicidal qualities are claimed for the limestone flour or spent bone black meal. These ingredients are added solely for increasing the tonic qualities of the remaining components so as to increase the benefits to the animal. The tonic elements are particularly beneficial in those cases where the parasites have so far sapped the strength of the animal as to require more building up than may be taken as food.

It is further necessary to know that in the ordinary handling of ranch animals, cattle, sheep and goats, it is customary and beneficial for them to have free access to a supply of sodium chloride (common salt) from which they may satisfy their salt appetite each day. This need is supplied by salt either in brick form or in feeders from which the supply is continually replenished as the animals take from it. With these basic conditions in mind it will be easy to see the ease of administering and treating the animals, and the benefit from our unique combination and process of use.

Copper sulphate alone or with a sodium chloride mixture, even with a proportion of as much as 25% in volume is not vermicidal for internal parasites in farm and ranch animals when used as a "salt," but such a quantity rapidly becomes toxic to animals when consumed daily.

Sodium arsenite, even in very small quantities, if absorbed into the system of the animal through the general circulation, is very irritating to the mucous membranes and even that amount contained in an ounce of a 1% solution will ordinarily cause the death of an animal.

Copper sulphate and sodium arsenite when put into a solution of water or saliva form copper arsenite and sodium sulphate. Copper arsenite is insoluble in water or saliva and is not vermicidal.

Hydrochloric acid has the properties necessary to change this salt of copper and arsenic plus the sodium sulphate into again copper sulphate plus arsenic oxide plus sodium chloride. Therefore, when the copper sulphate-sodium arsenite-sodium chloride combination is dissolved in saliva in the mouth of the animal, as is the case when the animal is permitted to "lick" as much as it desires, the copper arsenite-sodium sulphate salts are formed and are then swallowed by the animal. Upon reaching the stomach of the animal, in the small quantities in which the combination is taken into the stomach in the ordinary process of "salting" itself, the hydrochloric acid secreted by the hydrochloric acid secreting glands of the stomach convert the copper arsenic into copper sulphate-arsenic oxide and sodium chloride, and in as much as this latter chemical reaction takes place in the presence of the mucous membranes of the stomach, the chemical elements evolved or created are in a colloidal form rather than in their original crystal form, which is an explanation of the phenomenon of so small a quantity of copper sulphate and sodium arsenite with sodium chloride killing these internal parasites, and is an explanation of the fact that this method of parasite elimination may be continued over a long period of time without any toxic effect of either the copper or arsenic being manifested.

The advantages claimed for the mixture are that it may be administered to the animal in an ordinary, usual and natural manner, without disturbing in any way the feeding and watering habits of the animal and without handling the animal, and, since the animal in the satisfaction of its appetite for salt will take the proper amount of the mixture into its stomach daily, the continuous vermicidal effect is to kill not only the old worms but all such new ones as may come into the stomach of the animal each day, and by the continuous and general use of the mixture infestation of pastures will be eliminated. Of course, after continuous use has reduced the trouble, the proportion of vermicidal agencies may be reduced and increased as occasion may demand. For instance, in extremely hot and dry times there will not be the need for the mixture as there will be in those times when the atmosphere is saturated with moisture and it is warm enough to cause the eggs to hatch out.

In this connection, it may be stated that some of the ingredients of this mixture have been used for the purpose of a vermicidal agent in both liquid and powder form. In the administration of treatment, when so combined, it is necessary to take the animal away from feed and water for periods of six hours to twenty-four hours and then it is necessary to catch and hold each animal separately and give the medicine by force, in which case, some is wasted, the animal is sometimes injured, and in every case its feeding habits have been disturbed and it has been caused to lose flesh and is set back by at least ten days or two weeks. It can be readily seen that while such a method may kill those worms actually in the stomach of the animal at the time of the treatment, the animal will be taking others into the stomach each day thereafter and no permanent result is obtained. In our composition and method, the animal receives a vermicidal dose daily, which results in permanent benefit to the individual animal, and, if continued long enough, in the entire removal of such parasites from the range, and thence to the final elimination of the trouble, not only with those animals being treated but with the range itself.

The method by which we prepare the composition is: First, the copper sulphate-sodium arsenite components are ground to a fineness such as to permit its passing through a screen of not less than 100 mesh. These ingredients are then mixed with the sodium chloride, being careful to make the mixture at a time or under conditions when the sodium chloride is perfectly dry, then the inert ingredients are added and the whole thoroughly and uniformly mixed, after which it may be packed, preferably in paper lined bags in which it will keep indefinitely. The sodium chloride should be of a fineness similar to that of ordinary table salt.

It is claimed that this mixture and method of administration is new. That it will relieve the ranchman and farmer of the burden of periodical treatment of his animals for internal parasites, and, because treatment may be applied in a natural manner, it will not be necessary to keep the animals away from either food or water, nor will it be necessary to catch each animal and administer the treatment separately, thereby preserving flesh and increasing the beneficent results of the treatment. While no vermicidal qualities are claimed for the minerals in the mixture, other than copper sulphate, sodium arsenite, and sodium chloride, the addition of the same will tend to act as a tonic and will increase the benefit of the mixture and treatment.

The use of copper sulphate, arsenic and the combination of copper sulphate and sodium arsenite as vermifuges has been known for many years, and used with more or less success, however, the amounts necessary to effect destruction of the parasites have been a great deal larger than is required in the mixture we have, and necessarily the toxic effect on the animal has been in nearly all of such treatments visible, especially if administered often enough to take care of the new parasites being taken into the stomach each day.

The method of mixing these vermicidal agencies (which in themselves are not new) with sodium chloride, so as to create an easily administered and thoroughly effective vermicide, is entirely new, as is the method of administering by "salting," making the mixture admirably adapted to the treatment of range animals in great numbers. The dose taken daily by the animal is very small indeed, but the daily dosage is very effective in the treatment of infected animals as well as in preventing infection.

The advantage for this invention extends to the combination of vermicidal agencies with common salt and to the administration by the ordinary normal process of "salting" the animal, and may be summed up as follows:

1. Effective elimination of worms in the animal.
2. Prevention of further infestation by killing the new worms as they are taken into the stomach.
3. Simplicity of administration.
4. No disturbance of the ordinary feeding habits of the animal.
5. No handling of the animal required—as easy to treat a hundred or a thousand as to treat one.
6. Accuracy of dosage.
7. Use of hydrochloric acid secretions in the stomach of the animal to cause required chemical changes in the vermicidal agencies to cause same to be effective and non-toxic.
8. Final elimination of range infestation.
9. Cost of the mixture and treatment sufficiently low as to permit of general use and enable all to take advantage of the many benefits.
10. May be administered by ranchmen and farmers without expert assistance.
11. Frequent, natural dosage prevents the animals from reinfecting themselves on an infested range.

What is claimed to be new is:

1. A vermicidal composition comprising copper sulphate, sodium arsenite, sodium chloride, and a tonic ingredient.
2. A vermicidal composition including copper sulphate, sodium arsenite, sodium chloride, limestone flour and spent bone black.
3. A vermicidal composition including copper sulphate 128 grams, sodium arsenite 32 grams, limestone flour 10 pounds, and spent bone black 20 pounds.
4. A vermicidal composition comprising copper sulphate, sodium arsenite, and sodium chloride.

THOMAS O. BOOTH.
LUTHER H. MILLER.